G. W. TINSLEY.
Improvement in Paddle-Wheels.
No. 133,179. Patented Nov. 19, 1872.
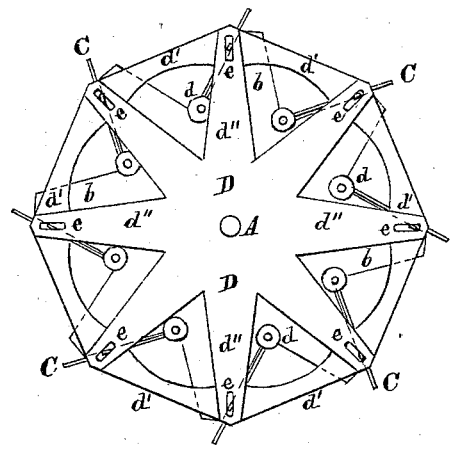
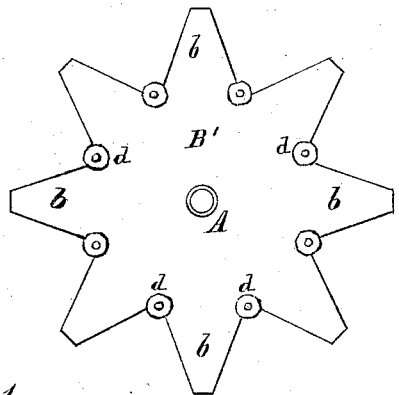
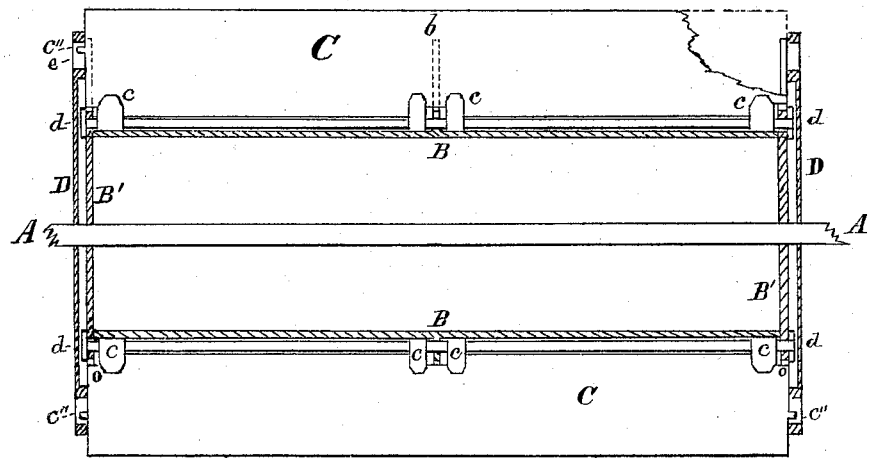
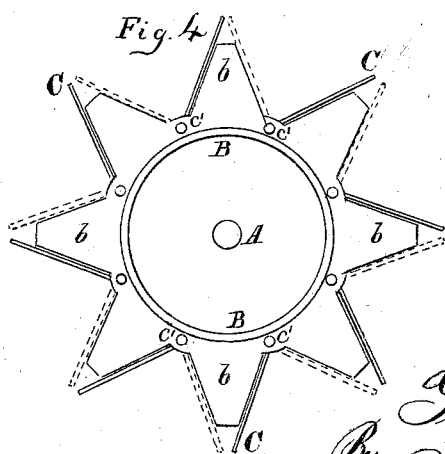
Witnesses:
J. A. Loundes
W. Lacey
Inventor:
George W. Tinsley
By N. Cranford
Atty.

UNITED STATES PATENT OFFICE.

GEORGE W. TINSLEY, OF MINNEAPOLIS, MINNESOTA.

IMPROVEMENT IN PADDLE-WHEELS.

Specification forming part of Letters Patent No. 133,179, dated November 19, 1872.

*To all whom it may concern:*

Be it known that I, GEORGE W. TINSLEY, of Minneapolis, in the county of Hennepin, in the State of Minnesota, have made certain Improvements in Wheels for Propelling Vessels, and other purposes, of which the following is a specification:

In the drawing, Figure 1 is a longitudinal sectional view of the wheel; Fig. 2, an end view; and Figs. 3 and 4 details.

A want has long existed in the construction of this class of propeller-wheels to have the buckets at the proper angle when they dip into and take hold of the water, in order to produce the best effect in propelling the vessel or boat in either direction, and such wheels necessarily have to be reversed in their revolutions in many instances, such as to slacken speed, to back the boat or vessel; or, in case of a "double-ender" ferry-boat, to work the propeller-wheel by revolving it in either direction, and have the buckets assume the same position or angle with relation to the horizontal or surface line of the water whether the wheel is revolved in one direction or the other; and the object of this invention is to supply this want and to automatically change the angle at which the buckets shall strike and enter the water; and it consists in the construction and combination of the parts of the wheel, as will more fully hereinafter be described.

A is the shaft upon which the wheel revolves, and is supported in the usual bearings. B is a hollow cylinder of proper diameter, having heads and any number of intermediate partitions B' that are fast upon the shaft A and revolve with it. Upon the circumference of these heads and partitions B' are angular rests or supports $b$ $b$, as many in number as there are buckets on the wheel. These rests or supports are formed by cutting out a portion of the heads or partitions B' which would project beyond the circumference of the hollow cylinder B, the angle of each rest being the same with relation to a radial line through the shaft A and center of each rest. C C are the buckets, hinged to the rods $c'$ $c'$, that pass horizontally through the heads and partitions B' by means of straps or other proper device $c$ $c$. Upon each end of the buckets C, and centrally with their width, are pins or journals $c''$ that project outside of the heads, and at the inner edge and outer ends the buckets C are cut at $o$ so that the bucket can project as far as the heads and strike upon the rests $b$, as the heads extend a little above the circumference of the cylinder B, which allows the buckets to freely oscillate in either direction, and be supported by the rests $b$. The hinge-rods $c'$ $c'$ are secured in the heads B' by means of the head or nuts $d$ $d$. D D are revolving heads, loose upon shaft A and outside of heads B', with as many radially-projecting arms $d''$ $d''$ as there are buckets in the wheel, which are connected at their outer circumference by the rim pieces $d'$ $d'$, as seen in Fig. 2. $e$ $e$ are radial slots through the arms $d''$, at the proper distance from the hinge-rod $c'$, to receive the pins or journals $c''$ of the buckets C.

By this construction of parts and mode of allowing vibration the buckets will assume the same relative position in the water, whether the boat is propelled forward or when the revolution of the wheel is reversed; and when the boat is slowed down or reversed in the direction of propulsion, the wheel will carry no dead water, nor will the buckets lift the water when they come out of it.

Having thus described my invention, what I claim, and desire to secure by Letters Patent, is—

1. The combination of the central cylinder B, hinged buckets C, and loose heads D, having arms $d''$ $d''$ and slots $e$ $e$, constructed substantially in the manner described.

2. The combination of the loose heads D, having arms $d''$ and slots $e$, hinged buckets C, with the central cylinder B, having rests $b$, heads or partitions B', and shaft A, forming a propeller-wheel, constructed to operate substantially in the manner and for the purpose specified.

GEORGE W. TINSLEY.

Witnesses:
CHAS. H. WOODS,
ALBERT SMITH.